United States Patent [19]

Mihoya et al.

[11] Patent Number: 5,719,206
[45] Date of Patent: Feb. 17, 1998

[54] AQUEOUS COATING COMPOSITIONS

[75] Inventors: Takashi Mihoya; Shinya Fujimatsu; Koichi Iibuchi, all of Tokyo, Japan

[73] Assignee: Toyo Ink Manufacturing Co., Ltd., Tokyo, Japan

[21] Appl. No.: 431,340

[22] Filed: Apr. 28, 1995

[30] Foreign Application Priority Data

Apr. 28, 1994 [JP] Japan ................... 6-090855

[51] Int. Cl.$^6$ ............... C08K 3/22; C08K 5/54
[52] U.S. Cl. ........... 523/212; 523/160; 523/213; 523/406; 523/467; 524/261; 524/262; 524/264; 524/558; 106/21 E
[58] Field of Search ................... 523/160, 212, 523/213, 406, 467; 524/262, 261, 264, 558; 106/21 E

[56] References Cited

U.S. PATENT DOCUMENTS

| | | | |
|---|---|---|---|
| 3,285,339 | 11/1966 | Walther et al. | 166/295 |
| 3,607,813 | 9/1971 | Purcell et al. | 524/556 |
| 3,625,287 | 12/1971 | Young | 166/295 |
| 4,101,474 | 7/1978 | Copeland et al. | 523/421 |
| 4,151,154 | 4/1979 | Berger | 523/212 |
| 4,318,832 | 3/1982 | Zabrocki et al. | 523/402 |
| 4,330,446 | 5/1982 | Miyosawa | 524/558 |
| 4,792,580 | 12/1988 | Doshi | 524/261 |
| 4,877,451 | 10/1989 | Winnik et al. | 106/490 |
| 5,318,681 | 6/1994 | Murase et al. | 523/212 |
| 5,420,177 | 5/1995 | Ohkura et al. | 523/212 |

FOREIGN PATENT DOCUMENTS

| | | | |
|---|---|---|---|
| 0255079 | 2/1988 | European Pat. Off. | 523/213 |
| 513368 | 11/1992 | European Pat. Off. | |
| 0232292 | 1/1986 | Germany | 523/212 |
| 55-3411 | 1/1980 | Japan . | |
| 55-94968 | 7/1980 | Japan . | |
| 57-90068 | 6/1982 | Japan . | |
| 58-160370 | 9/1983 | Japan . | |
| 59-147066 | 8/1984 | Japan . | |
| 62-177070 | 8/1987 | Japan . | |
| 62-278081 | 12/1987 | Japan . | |
| 2039993 | 2/1990 | Japan | 523/160 |
| 3-255181 | 11/1991 | Japan . | |
| 3-258861 | 11/1991 | Japan . | |
| 5-65445 | 3/1993 | Japan . | |
| 5-221640 | 8/1993 | Japan . | |

OTHER PUBLICATIONS

Abstract for JP 60-042437, Mar. 6, 1985.
Abstract for JP 60-188418 Sep. 25, 1985.
Abstract for JP 61-174937, Aug. 6, 1986.
Abstract for JP 6-100313, Apr. 12, 1994.

*Primary Examiner*—Andrew E. C. Merriam
*Attorney, Agent, or Firm*—Knobbe, Martens, Olson & Bear, LLP

[57] ABSTRACT

An aqueous coating composition includes: an inorganic particulate substance whose surface is modified with a silane coupling agent having at least one functional group selected from a group consisting of vinyl group, (meth)acryloyl group, epoxy group, and amino group; and an aqueous resin having a functional group which is reactive with the functional group of the silane coupling agent. The aqueous coating composition has excellent storage stability, pigment dispersion, coloring property, adhesion to various substrates, and printing properties, and can be used for various applications, such as printing ink, coating materials, adhesives, fiber treatment agents, surface treatment agents, and the like.

3 Claims, No Drawings

AQUEOUS COATING COMPOSITIONS

FIELD OF THE INVENTION

The present invention relates to an aqueous coating composition which is used for coating metal, wood, paper, leather, glass, fiber, plastic, foamed materials, concrete, and the like, and has excellent storage stability, pigment dispersion, coloring property, adhesion to various substrates, and printing properties, and to a process for producing the aqueous coating composition.

RELATED ART OF THE INVENTION

In the fields of printing ink, coating material, adhesive material, and the like, aqueous coating compositions containing inorganic particulate substances, such as titanium oxide, magnetic powder, red oxide, aluminum, silica, and the like, have heretofore been used from the standpoint of saving materials and less environmental pollution. However, the inorganic substances described above have larger specific gravities and higher surface hardnesses in comparison to organic pigments, and cause drawbacks, such as inferior dispersion stability of pigments and larger abrasion of gravure cylinders and doctors.

Particularly, aqueous white coating compositions using titanium oxide as the inorganic particulate substance require a higher concentration of the pigment to exhibit the covering power. However, it has been confirmed that a higher concentration of the pigment causes deterioration in the printing property and coating property. Examples of such deterioration include a marked decrease in adhesion caused by a decrease in the content of a resin which is the component providing the coating composition with pigment dispersion and adhesion, and occurrence of the fogging phenomenon caused by the lubricating property of the aqueous coating composition.

A method of modifying the surface of an inorganic particulate substance by a silane coupling agent has been proposed to overcome the drawbacks described above. However, it has been found that this method has a drawback in that storage stability and dispersion stability are inferior because of smaller adsorption of the resin to the surface of the inorganic particulate substance.

SUMMARY OF THE INVENTION

Accordingly, an object of the present invention is to provide an aqueous coating composition having excellent storage stability, pigment dispersion, coloring property, adhesion to various substrates, printing property, and coating property. Another object of the present invention is to provide a process for producing the aqueous coating composition having the excellent properties described above.

It has been found that these and other objects can be achieved by an aqueous coating composition comprising: an inorganic particulate substance whose surface is modified with a silane coupling agent having at least one functional group selected from the group consisting of vinyl group, (meth)acryloyl group, epoxy group and amino group; and an aqueous resin having a functional group which is reactive with the functional group of the silane coupling agent.

DETAILED DESCRIPTION OF THE INVENTION

The aqueous coating composition of the present invention is similar to conventional aqueous coating compositions with respect to the feature that the coating composition comprises an inorganic particulate substance whose surface is modified with a silane coupling agent and an aqueous resin. However, the aqueous coating composition of the present invention can be produced by a process comprising grafting to a silane coupling agent having at least one functional group selected from vinyl group, (meth)acryloyl group, epoxy group, and amino group, at the surface of the inorganic particulate substance, an aqueous resin having a functional group reactive with the functional group described above. The aqueous coating composition of the present invention is, therefore, characterized not only by improved dispersion in water, storage stability, coloring property, pigment dispersion, and adhesion to polar substrates, but also by improved printing property.

When the inorganic particulate substance whose surface is modified and the aqueous resin having a functional group do not react with each other, the storage stability and printing property deteriorate. In this case, the layer covering the surface of the inorganic particulate substance is peeled off, and the hard inorganic particulate substance comes in direct contact with a metal doctor of gravure printing, to cause marked abrasion of the doctor. As the result, scratching off of ink becomes incomplete, and fogging of the gravure cylinder is caused, i.e., ink adheres to regions other than those which are printed, leading to a deterioration in the quality of the printing.

The process comprising grafting described above comprises mixing the inorganic particulate substance described above whose surface has been modified with a silane coupling agent having a functional group with the aqueous resin having a functional group described above at a room temperature, and is not particularly limited otherwise. If necessary, the mixture may be heated, or a catalyst which promotes the grafting reaction, such as a tertiary amine like triethylamine, N,N-dimethylbenzylamine, tributylamine, N,N-diethylaniline, N,N-dimethylaniline, or the like, may be used. Even though the grafting reaction proceeds by merely mixing the components, the reaction further proceeds and completes when a coating layer is formed with the composition by a conventional method, such as printing, coating, impregnating, spraying, or the like.

The silane coupling agent used in the present invention has at least one functional group selected from the group consisting of vinyl group, (meth)acryloyl group, epoxy group, and amino group, and represented by the following general formula (I):

$$R\text{—}SiX_{3-n}Y_n \qquad \text{general formula (I)}$$

wherein R represents vinyl group or an alkyl group having at the end thereof at least one functional group selected from the group consisting of (meth)acryloyl group, epoxy group, and amino group, X represents an alkyl group, Y represents a hydrolyzable functional group or atom bonded to the silicon atom, such as methoxy group, ethoxy group, a chlorine atom, or the like, and n represents an integer of 1 to 3.

Examples of the silane coupling agent having a functional group include vinyltris(β-methoxyethoxy)silane, vinyltriethoxysilane, vinyltrimethoxysilane, γ-(methacryloxy-propyl)trimethoxysilane, γ-(3,4-epoxy-cyclohexyl)-ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, and γ-aminopropyltriethoxysilane.

Examples of the inorganic particulate substance include inorganic fillers, magnetic powders, and pigments, such as calcium carbonate, kaolin, mica, aluminum hydroxide, titanium oxide, silica, zinc yellow, red lead, red oxide, zinc oxide, talc, carbon black, barium sulfate, magnesium carbonate, γ-iron oxide, metal powders, asbestos, glass fibers, and the like. However, the inorganic particulate substance is not limited to the examples described above, and substances having a hydrophilic surface can be used. The substance having a hydrophilic surface is a substance having at the surface thereof a hydrophilic functional group such as hydroxyl group, or water of crystallization, or adsorbed water.

The inorganic particulate substance whose surface is modified is obtained by modifying 100 parts by weight of an inorganic particulate substance with 0.1 to 15 parts by weight of a silane coupling agent having at least one functional group selected from the group consisting of vinyl group, (meth)acryloyl group, epoxy group, and amino group.

Examples of the process for modifying the surface of an inorganic particulate substance by a silane coupling agent include a process in which the inorganic particulate substance is mixed with the silane coupling agent with or without dilution by using a suitable solvent, in a mixing machine, such as a V-type mixer or a Henschel mixer; a process in which the inorganic particulate substance and the silane coupling agent are added to water or an organic solvent, and water or the organic solvent is subsequently removed; and a process in which a silane coupling agent is directly added to an aqueous resin-inorganic particulate substance system.

The aqueous resin used in the present invention has a functional group reactive with the functional group in the silane coupling agent. The functional group in the aqueous resin is at least one functional group selected from the group consisting of carboxyl group, amino group, hydrazine group, and epoxy group, and is bonded to an end or an intermediate part of the main chain, or to a side chain of the resin. The aqueous resin having a functional group comprises an aqueous resin base into which the functional group has been incorporated. Examples of the aqueous resin base include aqueous polyurethane resins, aqueous acrylic resins, aqueous polyester resins, and the like. Among these aqueous resin bases, aqueous polyurethane resins and aqueous acrylic resins are preferably used because of ease of incorporation of the functional group reactive with the functional group in the silane coupling agent into the aqueous resin base.

In the aqueous coating composition of the present invention, particularly the aqueous printing ink of the present invention, it is preferable that the surface of the inorganic paritculate substnce is modified with a silane coupling agent having vinyl group or (meth)acryloyl group, and the aqueous resin has amino group or hydrazine group. It is also preferable that the surface of the inorganic particulate substance is modified with a silane coupling agent having epoxy group, and the aqueous resin has amino group, hydrazine group or carboxyl group. Also preferable is a combination in which the surface of the inorganic particulate substance is modified with a silane coupling agent having amino group, and the aqueous resin has epoxy group.

To the aqueous coating composition of the present invention, other conventionally used components, such as organic solvents, organic pigments, dyestuffs, emulsifiers, defoaming agents, surfactants, dispersion auxiliary agents, thickeners, heat stabilizers, leveling agents, agents preventing crater formation, agents preventing precipitation, ultraviolet light absorbents, flame retarders, and the like, may be added, if necessary.

Furthermore, a cured coating layer having excellent strength and resistance to chemicals can be formed by adding a conventional crosslinking agent to the aqueous coating composition of the present invention. The type of the crosslinking agent used differs in accordance with the specific combination of the silane coupling agent and the aqueous resin. For example, when an aqueous resin having carboxyl group is used, a polyaziridine compound, a polyepoxy compound, a polycarbodiimide compound, a metal chelate compound, a polyoxazoline compound, a polyisocyanate, a blocked polyisocyanate, a partially or completely etherized amino resin, or the like, can be used as the crosslinking agent. The crosslinking reaction may be conducted at a room temperature or may be accelerated by heating or by adding a conventional reaction catalyst.

The content of the inorganic particulate substance whose surface is modified in the aqueous coating composition is 15 to 70% by weight of the aqueous coating composition. The content of the aqueous resin having a functional group in the aqueous coating composition is 5 to 25% by weight of the aqueous coating composition.

The aqueous coating composition of the present invention is used as a printing ink, a coating material, an adhesive, a fiber treatment agent, a surface treatment agent, or the like, which contains an inorganic particulate substance and forms a resin coating layer on a desired substrate including paper, wood, metal, glass, fiber, leather, plastics, and foamed material, by a conventional method such as printing, coating, impregnating, spraying, or the like.

EXAMPLES

The invention will be understood more readily with reference to the following examples; however, these examples are intended to illustrate the invention and are not to be construed as limiting the scope of the invention. In the examples, "part" means "part by weight" and "%" means "% by weight".

The following components were each mixed by using a mixer for 1 hour and then dried for 12 hours at 100° C. in an air atmosphere to obtain the respective 9 types of inorganic particulate substance which were modified at the surface thereof. As the amount of the silane coupling agents used, a theoretical amount required for the silane coupling agent to cover 100% of the surface of the inorganic particulate substance was used. The theoretical amount was obtained from the weight and the specific surface area of the inorganic particulate substance and the minimum covering area of the silane coupling agent.

(Inorganic particulate substance (A) treated with a silane coupling agent)

| | |
|---|---|
| rutile type titanium oxide (a product of Ishihara Sangyo Kaisha, Ltd.) | 100 parts |
| γ-glycidoxypropyltrimethoxysilane (a product of Shin-Etsu Chemical Co., Ltd.; "KBM403") | 4.5 parts |

(Inorganic particulate substance (B) treated with a silane coupling agent)

(Inorganic particulate substance (C) treated with a silane coupling agent)

| | |
|---|---|
| rutile type titanium oxide (a product of Ishihara Sangyo Kaisha, Ltd.) | 100 parts |
| vinyltrimethoxysilane (a product of Shin-Etsu Chemical Co., LTD.; "KBM1003") | 2.9 parts |

(Inorganic particulate substance (D) treated with a silane coupling agent)

| | |
|---|---|
| rutile type titanium oxide (a product of Ishihara Sangyo Kaisha, Ltd.) | 100 parts |
| γ-methacryloxypropyltrimethoxysilane (a product of Shin-Etsu Chemical Co., LTD.; "KBM503") | 4.8 parts |

(Inorganic particulate substance (E) treated with a silane coupling agent)

| | |
|---|---|
| rutile type titanium oxide (a product of Ishihara Sangyo Kaisha, Ltd.) | 100 parts |
| N-β-(aminoethyl)-γ-aminopropyltrimethoxysilane (a product of Shin-Etsu Chemical Co., Ltd.; "KBM603") | 4.3 parts |

(Inorganic particulate substance (F) treated with a silane coupling agent)

| | |
|---|---|
| rutile type titanium oxide (a product of Ishihara Sangyo Kaisha, Ltd.) | 100 parts |
| hexyltrimethoxysilane (a product of Toshiba Silicone Co., LTD.; "TSL8241") | 4.0 parts |

(Inorganic particulate substance (G) treated with a silane coupling agent)

| | |
|---|---|
| red oxide (red iron oxide) | 100 parts |
| γ-glycidoxypropyltrimethoxysilane (a product of Shin-Etsu Chemical Co., LTD.; "KBM403") | 4.4 parts |

(Inorganic particulate substance (H) treated with a silane coupling agent)

| | |
|---|---|
| red oxide (red iron oxide) | 100 parts |
| hexyltrimethoxysilane (a product of Toshiba Silicone Co., Ltd.; "TSL8241") | 4.0 parts |

(Inorganic particulate substance (H) treated with a silane coupling agent)

| | |
|---|---|
| rutile type titanium oxide (a product of Ishihara Sangyo Kaisha, Ltd.) | 100 parts |
| γ-glycidoxypropyltrimethoxysilane (a product of Shin-Etsu Chemical Co., Ltd.; "KBM403") | 0.1 parts |

(Inorganic particulate substance (I) treated with a silane coupling agent)

| | |
|---|---|
| rutile type titanium oxide (a product of Ishihara Sangyo Kaisha, Ltd.) | 100 parts |
| γ-glycidoxypropyltrimethoxysilane (a product of Shin-Etsu Chemical Co., Ltd.; "KBM403") | 15 parts |

Synthesis Example (1) of an Aqueous Resin Having a Functional Group

In a four-necked flask equipped with a thermometer, a stirrer, and a reflux condenser, 67.1 parts of polybutylene adipate glycol, 7.5 parts of polyethylene glycol, 14.3 parts of dimethylol propionic acid, and 90 parts of methyl ethyl ketone were placed, and the mixture was heated to 80° C. in a nitrogen atmosphere while being stirred. When the temperature stabilized, 48.0 parts of isophorone diisocyanate was added dropwise to the mixture, and then a solution obtained from 0.015parts of dibutyltin dilaurate and 10 parts of methyl ethyl ketone was added to the mixture. The resultant mixture was allowed to react for 3 hours at the same temperature, and a solution of a polymer containing isocyanate group was obtained. The reaction solution was then cooled to a temperature of 30° C. or lower, and a solution obtained from 13.0 parts of isophoronediamine, 25 parts of water, and 200 parts of acetone was added to the reaction solution dropwise over 1 hour. The reaction solution was heated to 50° C., and the reaction was finished. Then, a mixed solution of 7.2 parts of 25% ammonia water and 320 parts of water was added dropwise to the reaction solution, and an aqueous dispersion of a polyurethane resin was obtained. The solvents were removed from the aqueous dispersion thus obtained under reduced pressure at 60° C., and aqueous dispersion (1) (solid content: 30%) of a polyurethane resin having carboxyl group and terminal amino group was obtained.

Synthesis Example (2) of an Aqueous Resin Having a Functional Group

After a solution of a polymer containing isocyanate group was obtained by the same method as that used in Synthesis Example (1), the reaction solution was cooled to a temperature of 30° C. or lower. To the reaction solution, a mixed solution obtained from 11.5 parts of isophoronediamine and 150 parts of acetone was added dropwise over 1 hour. The reaction was allowed to proceed for 30 minutes at the same temperature, and a solution of a polymer containing isocyanate group and having a higher molecular weight was obtained. Then, a mixed solution obtained from 1.5 parts of adipic acid dihydrazide, 25 parts of water, and 50 parts of acetone was added dropwise to the reaction solution. The reaction solution was heated to 50° C., and the reaction was finished. Then, a mixed solution of 7.2 parts of 25% ammonia water and 320 parts of water was added dropwise to the reaction solution, and an aqueous dispersion of a polyurethane resin was obtained. The solvents were removed from the aqueous dispersion thus obtained under reduced pressure at 60° C., and aqueous dispersion (2) (solid content: 30%) of a polyurethane resin having carboxyl group and terminal hydrazine functional group was obtained.

Synthesis Example (3) of an Aqueous Resin Having a Functional Group

In an apparatus similar to that used in Synthesis Example (1), 67.4 parts of polybutylene adipate glycol, 7.5 parts of polyethylene glycol, 14.3 parts of dimethylolpropionic acid, and 90 parts of methyl ethyl ketone were placed, and the mixture was heated to 80° C. in a nitrogen atmosphere while being stirred. When the temperature stabilized, 48.1 parts of isophorone diisocyanate was added dropwise to the mixture, and then a solution obtained from 0.015 parts of dibutyltin dilaurate and 10 parts of methyl ethyl ketone was added to the mixture. The resultant mixture was allowed to react for 3 hours at the same temperature, and a solution of a polymer containing isocyanate group was obtained. The reaction solution was then cooled to a temperature of 30° C. or lower, and a solution obtained from 11.5 parts of isophoronediamine, 1.1 parts of dibutylamine, and 200 parts of acetone was added to the reaction solution dropwise over 1 hour. The reaction solution was heated to 50° C., and the reaction was finished. Then, a mixed solution of 5.5 parts of 25% ammonia water and 345 parts of water was added dropwise to the reaction solution, and an aqueous dispersion of a polyurethane resin was obtained. The solvents were removed from the aqueous dispersion thus obtained under reduced pressure at 60° C., and aqueous dispersion (3) (solid content: 30%) of a polyurethane resin having carboxyl group was obtained.

Synthesis Example (4) of an Aqueous Resin Having a Functional Group

In an apparatus similar to that used in Synthesis Example (1), 24.2 parts of t-butyl methacrylate, 15.7 parts of n-butyl acrylate, 2.4 parts of 2-hydroxyethyl acrylate, 12.1 parts of polyethylene oxide acrylate, 6.0 parts of acrylic acid, 2,4 parts of azobisisobutyronitrile, 11.5 parts of water, and 104 parts of isopropyl alcohol were placed, and the mixture was heated to 80° C. in a nitrogen atmosphere while being stirred. When the temperature stabilized, 24.2 parts of t-butyl methacrylate, 15.7 parts of n-butyl acrylate, 2.4 parts of 2-hydroxyethyl acrylate, 12.1 parts of polyethylene oxide acryiate, 6.0 parts of acrylic acid, 11.5 parts of water, and 104 parts of isopropyl alcohol were placed in a dropping tube, and this mixture was added dropwise to the mixture in the apparatus described above over 1 hour. The resultant mixture was allowed to react for 3 hours at the same temperature. The reaction solution was then cooled to a temperature of 60° C. or lower. Then, 6.3 parts of 25% ammonia water and 311 parts of water were added to the reaction solution, and an aqueous dispersion of an acrylic resin was obtained. The solvent was removed from the aqueous dispersion thus obtained under reduced pressure at 60° C., and subsequently 26.6 parts of water was added to the product. Thus, aqueous dispersion (4) (solid content: 30%) of an acrylic resin having carboxyl group was obtained.

Synthesis Example (5) of an Aqueous Resin Having a Functional Group

Aqueous dispersion (5) (solid content: 30%) of an acrylic resin having caboxyl group and epoxy group was obtained by the same method as that used in Synthesis Example (4) except that 6.0 parts of glycidyl methacrylate was added to the mixture in the apparatus and to the mixture in the dropping tube, respectively. The mixture in the apparatus and the mixture in the dropping tube were similar to those used in Synthesis Example (1).

EXAMPLE 1

49 parts of aqueous dispersion (1) of a polyurethane resin having carboxyl group and terminal amino group, 6 parts of water, and 5 parts of isopropyl alcohol were added to 40 parts of inorganic particulate substance (A) treated with a silane coupling agent, and an aqueous printing ink was obtained by a conventional method.

EXAMPLE 2

49 parts of aqueous dispersion (2) of a polyurethane resin having carboxyl group and terminal hydrazine functional group, 6 parts of water, and 5 parts of isopropyl alcohol were added to 40 parts of inorganic particulate substance (A) treated with a silane coupling agent, and an aqueous printing ink was obtained by a conventional method.

EXAMPLE 3

49 parts of aqueous dispersion (3) of a polyurethane resin having carboxyl group, 6 parts of water, and 5 parts of isopropyl alcohol were added to 40 parts of inorganic particulate substance (A) treated with a silane coupling agent, and an aqueous printing ink was obtained by a conventional method.

EXAMPLE 4

49 parts of aqueous dispersion (5) of an acrylic resin having carboxyl group and epoxy group, 6 parts of water, and 5 parts of isopropyl alcohol were added to 40 parts of inorganic particulate substance (D) treated with a silane coupling agent, and an aqueous printing ink was obtained by a conventional method.

EXAMPLE 5

49 parts of aqueous dispersion (1) of a polyurethane resin having carboxyl group and terminal amino group, 6 parts of water, and 5 parts of isopropyl alcohol were added to 40 parts of inorganic particulate substance (B) treated with a silane coupling agent, and an aqueous printing ink was obtained by a conventional method.

EXAMPLE 6

49 parts of aqueous dispersion (2) of a polyurethane resin having carboxyl group and terminal hydrazine functional group, 6 parts of water, and 5 parts of isopropyl alcohol were added to 40 parts of inorganic particulate substance (B) treated with a silane coupling agent, and an aqueous printing ink was obtained by a conventional method.

EXAMPLE 7

49 parts of aqueous dispersion (1) of a polyurethane resin having carboxyl group and terminal amino group, 6 parts of water, and 5 parts of isopropyl alcohol were added to 40 parts of inorganic particulate substance (C) treated with a silane coupling agent, and an aqueous printing ink was obtained by a conventional method.

EXAMPLE 8

49 parts of aqueous dispersion (2) of a polyurethane resin having carboxyl group and terminal hydrazine functional group, 6 parts of water, and 5 parts of isopropyl alcohol were added to 40 parts of inorganic particulate substance (C) treated with a silane coupling agent, and an aqueous printing ink was obtained by a conventional method.

EXAMPLE 9

45 parts of aqueous dispersion (4) of an acrylic resin having carboxyl group and 5 parts of water were added to 50 parts of inorganic particulate substance (F) treated with a silane coupling agent, and an aqueous coating material was obtained by milling the mixture with a three-roll mill.

EXAMPLE 10

49 parts of aqueous dispersion (1) of a polyurethane resin having carboxyl group and terminal amino group, 6 parts of water, and 5 parts of isopropyl alcohol were added to 40 parts of inorganic particulate substance (H) treated with a silane coupling agent, and an aqueous printing ink was obtained by a conventional method.

EXAMPLE 11

49 parts of aqueous dispersion (1) of a polyurethane resin having carboxyl group and terminal amino group, 6 parts of water, and 5 parts of isopropyl alcohol were added to 40 parts of inorganic particulate substance (I) treated with a silane coupling agent, and an aqueous printing ink was obtained by a conventional method.

EXAMPLE 12

70 parts of aqueous dispersion (1) of a polyurethane resin having carboxyl group and terminal amino group, 7 parts of water, and 8 parts of isopropyl alcohol were added to 15 parts of inorganic particulate substance (A) treated with a silane coupling agent, and an aqueous printing ink was obtained by a conventional method.

EXAMPLE 13

20 parts of aqueous dispersion (1) of a polyurethane resin having carboxyl group and terminal amino group, 5 parts of water, and 5 parts of isopropyl alcohol were added to 70 parts of inorganic particulate substance (A) treated with a silane coupling agent, and an aqueous printing ink was obtained by a conventional method.

EXAMPLE 14

16.7 parts of aqueous dispersion (1) of a polyurethane resin having carboxyl group and terminal amino group, 8 parts of water, and 6 parts of isopropyl alcohol were added to 69.3 parts of inorganic particulate substance (A) treated with a silane coupling agent, and an aqueous printing ink was obtained by a conventional method.

EXAMPLE 15

83.3 parts of aqueous dispersion (1) of a polyurethane resin having carboxyl group and terminal amino group, 1 part of water, and 0.7 parts of isopropyl alcohol were added to 15 parts of inorganic particulate substance (A) treated with a silane coupling agent, and an aqueous printing ink was obtained by a conventional method.

EXAMPLE 16

49 parts of aqueous dispersion (1) of a polyurethane resin having carboxyl group and terminal amino group, 5.5 parts of water, 5 parts of isopropyl alcohol, and 0.5 parts of triethylamine were added to 40 parts of inorganic particulate substance (A) treated with a silane coupling agent, and an aqueous printing ink was obtained by a conventional method.

COMPARATIVE EXAMPLE 1

49 parts of aqueous dispersion (3) of a polyurethane resin having carboxyl group, 6 parts of water, and 5 parts of isopropyl alcohol were added to 40 parts of rutile-type titanium oxide whose surface had not been modified with a silane coupling agent (a product of Ishihara Sangyo Kaisha, Ltd.), and an aqueous printing ink was obtained by a conventional method.

COMPARATIVE EXAMPLE 2

49 parts of aqueous dispersion (3) of a polyurethane resin having carboxyl group, 6 parts of water, and 5 parts of isopropyl alcohol were added to 40 parts of inorganic particulate substance (E) treated with a silane coupling agent, and an aqueous printing ink was obtained by a conventional method.

COMPARATIVE EXAMPLE 3

45 parts of aqueous dispersion (4) of an acrylic resin having carboxyl group and 5 parts of water were added to 50 parts of red oxide (red iron oxide) whose surface had not been modified with a silane coupling agent, and an aqueous coating material was obtained by milling the mixture with a three-roll mill.

COMPARATIVE EXAMPLE 4

45 parts of aqueous dispersion (4) of an acrylic resin having carboxyl group and 5 parts of water were added to 50 parts of inorganic particulate substance (G) treated with a silane coupling agent, and an aqueous coating material was obtained by milling the mixture with a three-roll mill.

By using the aqueous printing inks obtained in Examples 1 to 16 and Comparative Examples 1 to 4, gravure printings were made on polyester films treated with corona discharge and polypropylene films treated with corona discharge, and a low density polyethylene was extrusion-laminated on the printed films to prepare laminates. Adhesive strength of the laminates to 180 degree peeling was measured, and the results are shown in Table 1. Coloring property, storage stability, printing property (fogging of the gravure cylinder), and coating property of the aqueous coating compositions obtained in Examples 1 to 16 and Comparative Example 1 to 4 were evaluated, and the results are shown in Table 1. The evaluations were conducted according to the following methods:

(1) Adhesive strength to peeling of a laminate treated with the extrusion-lamination An obtained aqueous printing ink was diluted with a mixed solvent of 45 parts of water, 40 parts of ethanol, and 15 parts of isopropanol in such a manner that the viscosity of the solution measured by using ZAHN cup #3 (a product of Rigosha & Co., Ltd.) was adjusted to 18 seconds (25° C.). By using the solution thus prepared, a polyester (PE) film (a product of Toyoho Co., Ltd.; "ESTER E5100"; thickness, 12 µm) treated with corona discharge and a polypropylene (PP) film (a product of Toyobo Co., Ltd.; "PYLEN P2161"; thickness, 20 µm) treated with corona discharge were gravure printed on the respective surface treated with corona discharge by using a gravure plate having a plate depth of 25 µm at a drying temperature of 60° C. at a printing speed of 80 m/minute. The printed surface of the printed film thus obtained was coated with a polyethyleneimine anchor coating material (a product of Toyo-Morton Ltd.; "EL-420") or a polyisocyanate anchor coating material (a product of Toyo-Morton Ltd.; "EL-510A/AD RT-80"). On the coated surface, a low density polyethylene (a product of Mitsubishi Petrochemical Company, Ltd.; "YUKALON LK-30") was extrusion-laminated, and a laminate was obtained. The laminate obtained by using the polyisocyanate anchor coating material was aged at 40° C. for 3 days.

The laminate thus obtained was cut into a test piece of a width of 15 mm, and the adhesive strength of the test piece to 180 degree peeling was measured at 25° C. in a relative humidity of 65% at a peeling speed of 300 mm/minute.

(2) Coloring property

The appearance of a printed film and a coated film was visually observed and evaluated with respect to the total combination of concentration, gloss, and transparency. The result of the evaluation was classified into one of the following two classes: ○: good; x: poor. When the pigment dispersion is better, the coloring property is also better.

(3) Storage stability

The appearance of an aqueous coating composition was visually observed before and after storage at 40° C. for 1 week and compared. The result of the evaluation was classified into one of the following two classes: ○: no change observed; x: change observed.

(4) Printing property (fogging of the gravure cylinder) and coating property.

For evaluation of the printing property, an aqueous printing ink was diluted with a mixed solvent of 45 parts of water, 40 parts of ethanol, and 15 parts of isopropanol in such a manner that viscosity of the solution measured by using ZAHN cup #3 (a product of Rigosha & Co., Ltd.) was adjusted to 18 seconds (25° C.). By using the solution thus prepared, a polypropylene (PP) film (a product of Toyoho Co., LTD.; "PYLEN P2161"; thickness, 20 μm) treated with corona discharge was gravure printed for 30 minutes on the surface treated with corona discharge by using a gravure plate having a plate depth of 25 μm at a drying temperature of 50° C. at a printing speed of 50 m/minute. Ten sheets of the printed film were laid together in such a manner that the respective printed portions superposed on top of eachother precisely and were not superposed on any non-printed portions. The condition of the non-printed portions was visually obseved to determine whether there was fogging of the gravure cylinder. The result of the evaluation was classified into one of the following two classes: ○: fogging of the gravure cylinder not observed; x: fogging of the gravure cylinder observed.

For the evaluation of the coating property, an aqueous coating material was spray coated on the surface of 100 glass plates (each plate having a surface area of 2500 cm$^2$) by using a spray gun. The coating property was evaluated by visual observation of condition of the nozzle of the spray gun and bleeding and sag of the coating material. The result was classified into one of the following two classes: ○: good; x: poor.

TABLE 1

| | adhesive strength to peeling (g/15 mm) | | | | coloring property | storage stability | printing property |
|---|---|---|---|---|---|---|---|
| | "EL-420" | | "EL-510" | | | | |
| | PP | PE | PP | PE | | | |
| Example 1 | 60 | 100 | 110 | 90 | ○ | ○ | ○ |
| Example 2 | 70 | 110 | 110 | 100 | ○ | ○ | ○ |
| Example 3 | 50 | 100 | 100 | 90 | ○ | ○ | ○ |
| Example 4 | 80 | 110 | 120 | 140 | ○ | ○ | ○ |
| Example 5 | 110 | 100 | 170 | 200 | ○ | ○ | ○ |
| Example 6 | 120 | 120 | 90 | 100 | ○ | ○ | ○ |
| Example 7 | 90 | 110 | 110 | 120 | ○ | ○ | ○ |
| Example 8 | 100 | 120 | 100 | 120 | ○ | ○ | ○ |
| Example 9 | — | — | — | — | ○ | ○ | ○ |
| Example 10 | 50 | 100 | 100 | 90 | ○ | ○ | ○ |
| Example 11 | 80 | 120 | 140 | 140 | ○ | ○ | ○ |
| Example 12 | 90 | 130 | 140 | 160 | ○ | ○ | ○ |
| Example 13 | 50 | 100 | 100 | 90 | ○ | ○ | ○ |
| Example 14 | 50 | 90 | 90 | 90 | ○ | ○ | ○ |
| Example 15 | 100 | 130 | 140 | 160 | ○ | ○ | ○ |
| Example 16 | 60 | 110 | 100 | 100 | ○ | ○ | ○ |

TABLE 1-continued

| | adhesive strength to peeling (g/15 mm) | | | | coloring property | storage stability | printing property |
|---|---|---|---|---|---|---|---|
| | "EL-420" | | "EL-510" | | | | |
| | PP | PE | PP | PE | | | |
| Comparative Example 1 | 30 | 25 | 40 | 45 | X | X | X |
| Comparative Example 2 | 40 | 90 | 130 | 80 | ○ | X | X |
| Comparative Example 3 | — | — | — | — | X | X | X |
| Comparative Example 4 | — | — | — | — | ○ | X | X |

As can be understood from the results in Table 1, it is clear that the aqueous coating composition of the present invention has excellent storage stability, pigment dispersion, coloring property, adhesion to various substrates, and printing property.

What is claimed is:

1. A process for producing an aqueous coating composition, comprising the step of:

modifying a surface of an inorganic particulate substance with a silane coupling agent having at least one functional group selected from the group consisting of vinyl group, (meth)acryloyl group, epoxy group, and amino group, at the surface of said inorganic particulate substance, to cover said surface with said silane coupling agent; and grafting to said inorganic particulate substance via said silane coupling agent a water-dispersible resin dispersed in water said water-dispersible resin having at least one functional group which is reactive with the functional group of the silane coupling agent, wherein said at least one functional group in said water-dispersible resin is selected from the group consisting of:

(a) a carboxyl group with at least one additional group selected from the group consisting of an amino group or a hydrazine group;

(b) a carboxyl group with at least one additional group which is an epoxy group; and (c) a carboxyl group without an amino group, a hydrazine group or an epoxy group;

wherein when (a) is selected, the functional group of said coupling agent is selected from the group consisting of an epoxy group, a vinyl group, and a (meth)acryloyl group;

wherein when (b) is selected, the functional group of said coupling agent is selected from the group consisting of an epoxy group and an amino group; and wherein when (c) is selected, the functional group of said coupling agent is an epoxy group.

2. A process for producing an aqueous coating composition according to claim 1, wherein said water-dispersible resin having said at least one functional group is based on a water-dispersible resin which is a water-dispersible polyurethane or a water-dispersible acrylic resin.

3. A process for producing an aqueous coating composition according to claim 1, wherein the content of said water-dispersible resin having at least one functional group in said aqueous coating composition is 5 to 25% by weight based on the weight of said aqueous coating composition.

* * * * *